United States Patent [19]

Bossche

[11] Patent Number: 5,156,085
[45] Date of Patent: Oct. 20, 1992

[54] KNOTTER TRIP MECHANISM WITH COOPERATING CLUTCH MECHANISM

[75] Inventor: Bart V. D. Bossche, Zedelgem, Belgium

[73] Assignee: Ford New Holland, Inc., New Holland, Pa.

[21] Appl. No.: 607,174

[22] Filed: Oct. 31, 1990

[51] Int. Cl.⁵ ............................................. B65B 13/26
[52] U.S. Cl. ..................................... 100/4; 100/19 R; 100/142; 100/189
[58] Field of Search .................. 100/4, 189, 142, 19 R, 100/43; 56/341, 342, 343

[56] References Cited

U.S. PATENT DOCUMENTS

| 2,560,143 | 11/1950 | Vietti | 100/4 |
| 2,772,628 | 12/1956 | Nolt | 100/4 |
| 2,897,748 | 8/1959 | Nolt et al. | 100/4 |
| 3,092,226 | 6/1963 | Williamson | 100/4 |
| 4,117,775 | 10/1978 | White et al. | 100/19 R |
| 4,503,762 | 3/1985 | Naaktgeboren | 100/4 |

FOREIGN PATENT DOCUMENTS 217053 3/1907 Fed. Rep. of Germany .
296340 2/1914 Fed. Rep. of Germany .
804616 3/1951 Fed. Rep. of Germany .
1095044 12/1960 Fed. Rep. of Germany .
8300599 3/1983 PCT Int'l Appl. .
1169137 10/1969 United Kingdom .

Primary Examiner—Harvey C. Hornsby
Assistant Examiner—Reginald L. Alexander
Attorney, Agent, or Firm—Frank A. Seemar; Larry W. Miller

[57] ABSTRACT

In a baler having a plunger reciprocating in a bale case and knotters for tying strands of twine around bales, two trip mechanisms are provided for automatic actuation of the knotters. A first trip mechanism is capable of preventing operation of the knotters until a bale of desired length is formed. A clutch mechanism for driving the knotters includes a pawl assembly with an abutment tab. A second trip mechanism holds the pawl assembly in a position where it prevents the knotters from being driven when the plunger is retracted. The initial displacement of the second trip mechanism toward a position where the knotters are driven is in substantially the same direction as the initial displacement of the pawl assembly abutment tab.

4 Claims, 6 Drawing Sheets

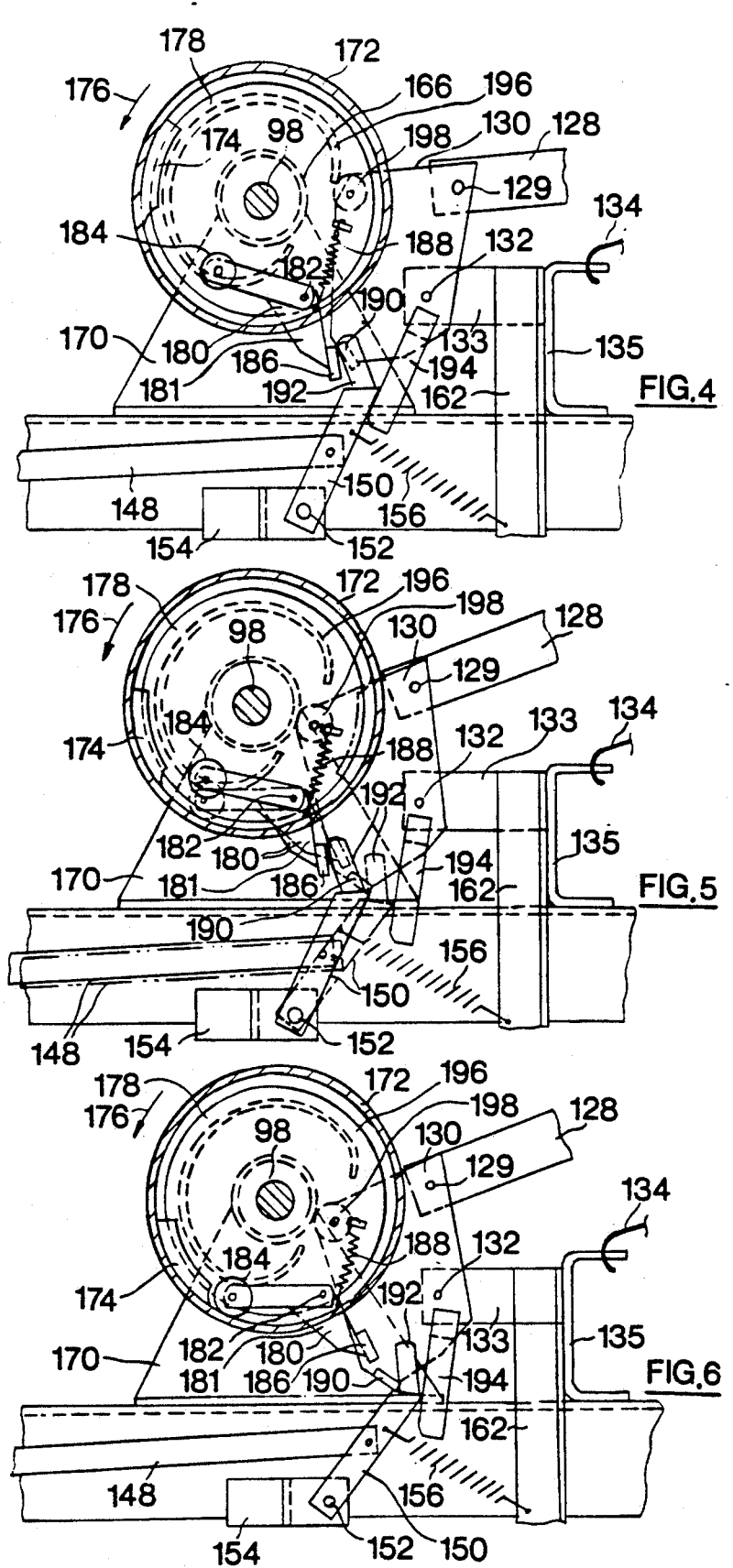

KNOTTER TRIP MECHANISM WITH COOPERATING CLUTCH MECHANISM

BACKGROUND OF THE INVENTION

This invention relates generally to agricultural balers and, in particular, to knotter trip mechanisms for such balers.

In a conventional type of baler, a plunger reciprocates in a bale case to form crop material into rectangular bales. Tying mechanisms comprising needles and knotters are provided to tie several strands of binding material such as twine around the bales, and a trip mechanism is employed for automatically actuating the knotters when bales reach a desired length. Such trip mechanisms are disclosed in U.S. Pat. No. 2,897,748 and British application 1,169,137.

Conventionally, the knotter drive shaft controlling the operation of both the needles and the knotter mechanisms is rotated at the same rotational speed as the plunger crank arm so that the knot tying cycle is completed only when the plunger is retracting, or while the bale, which previously has been compressed in the bale chamber, is springing back thereby resulting in the bale being of relatively low density as it exits from the bale chamber. This characteristic causes low energy efficiency as crop material has to be compressed much harder to obtain a given density in the finished bale. This characteristic also may cause problems with the knot tying operation as knots may not hold firmly after completion.

Although these problems are not critical in conventional, small rectangular balers which produce bales typically weighing in the range of 20 to 30 kg, the situation is different with medium and large rectangular balers which produce bales weighing in the range of 200 up to 1000 kg. In such medium and large square balers, the problems described above that are caused by the bales expanding in the bale case prior to the knotting cycles being completed are much more noticeable. The springing back of crop material prior to the knotting cycle being completed is much more significant causing bales of relatively low density and resulting in power inefficiency. Also, the knot tying operation is often adversely affected resulting in frequent misties.

It has already been proposed in the art, as disclosed in German patent 1,095,044, to rotate the tying mechanism drive shaft at twice the rotational speed of the plunger crank arm. Others also have already proposed, as disclosed in German patent 804,616, to rotate the tying mechanism main shaft through only one half or one third of a complete revolution during the tying cycle. With both of these proposals, the tying operation is completed in less than one complete reciprocating cycle of the plunger thereby greatly reducing the above-described problems. However, these proposals have caused another problem which is concerned with timing the operation of the tying mechanism with the plunger movement. In conventional hay balers, the knotter drive shaft is rotated at the same rotational speed as the plunger crank arm when the knotter trip mechanism is tripped. Therefore, timing the knotter operation with the plunger movement is very simple. As is generally known in the art, the knotter trip mechanism is operable to always trip the knotter cycle at precisely the same point in the plunger cycle. Incorrect timing between the plunger movement and the knotting cycle would disturb and make the knotter operation ineffective. Unless special precautions are taken, such incorrect timing easily could occur in arrangements where the tying cycle is completed in less than a full reciprocating cycle of the plunger.

U.S. Pat. No. 4,503,762 discloses means for timing the tying cycle with the movement of the plunger in the direction to compress crop material in the bale case. A tying mechanism is provided with a drive line including a clutch mechanism having a pawl assembly, the position of which is controlled by a first trip mechanism coupled to a bale length metering apparatus. In addition, a second trip mechanism is cooperable with the pawl assembly and operatively associated with the baler plunger in a manner such that the pawl assembly, when tripped by the first trip mechanism to a drive engaging position, is returned to its drive interrupting position when the plunger is retracting in the bale case. The second trip mechanism, however, is continuously oscillated between a pawl assembly holding position and a pawl assembly releasing position during the entire bale compressing cycle preceding the tying cycle of the formed bale. This manner of operation is very inefficient considering that the second trip mechanism only has to interfere once in a complete bale forming cycle, and more specifically, during the tripping of the tying mechanism. Unnecessary wear of the components of the second trip mechanism results therefrom, requiring increased maintenance. Furthermore, the structure operatively connecting the baler plunger to the second trip mechanism is located close to the plunger compressing area where the structure is subjected to dirt and crop resulting in abrasion and possible lack of operation. The second trip mechanism is positioned such that, upon the first trip mechanism being tripped, it cannot prevent an initial coupling between the tying mechanism and its drive line. Such an initial coupling is prevented after a short angular displacement of the tying mechanism drive shaft provided the baler plunger is retracting in the bale case. Accordingly, energy is lost in setting the tying mechanism in motion for a small initial displacement. This initial displacement results in the tying mechanism being removed from its optimum start position thereby causing high inertia forces when it is actuated a second time to complete the tying cycle.

SUMMARY OF THE INVENTION

It is an object of the present invention to overcome the aforementioned problems and more specifically to provide a baler with improved power efficiency and fewer continuously oscillating elements.

According to the present invention, a baler comprises a bale case, a plunger reciprocable in the bale case for compressing crop material into bales, a tying mechanism mounted on the bale case for tying a strand of binding material around a bale, and drive means for driving the tying mechanism. This drive means includes a clutch mechanism which has a pawl assembly movable between a drive interrupting position and a drive engaging position. The pawl assembly has an abutment tab. The baler also comprises bale length metering means, and first trip means operatively associated with the bale length metering means and cooperable with the pawl assembly abutment tab. The metering means is operable, until a bale of predetermined length is formed, to locate the first trip means in a pawl assembly holding position maintaining the pawl assembly in its drive interrupting position and, when a bale of predetermined length is formed, to retract the first trip means to a pawl assembly releasing position permitting the pawl assembly to move to its drive engaging position. The baler further comprises second trip means also cooperable with the pawl assembly abutment tab and movable between a pawl assembly holding position for maintaining the pawl assembly in its drive interrupting position and a pawl assembly releasing position for permitting the pawl assembly to move to its drive engaging position. The second trip means is operatively associated with the plunger in a manner so that the second trip means is positioned in its pawl assembly holding position when the plunger is retracted.

The initial displacement of the second trip means, when moved from its pawl assembly holding position towards its pawl assembly releasing position, is oriented substantially in the same direction as the initial displacement of the pawl assembly abutment tab, when the pawl assembly is moved from its drive interrupting position toward its drive engaging position.

The present invention may be used on all types of square balers, including conventional or small rectangular balers. However, the present invention is particularly useful on medium and large square balers.

DESCRIPTION OF THE DRAWINGS

FIG. 4 is an enlarged sectional view taken along lines 4—4 in FIG. 3;

FIGS. 5 and 6 are views similar to FIG. 4 taken at various stages in the operation of the baler;

DESCRIPTION OF THE PREFERRED EMBODIMENT

Figure 1:
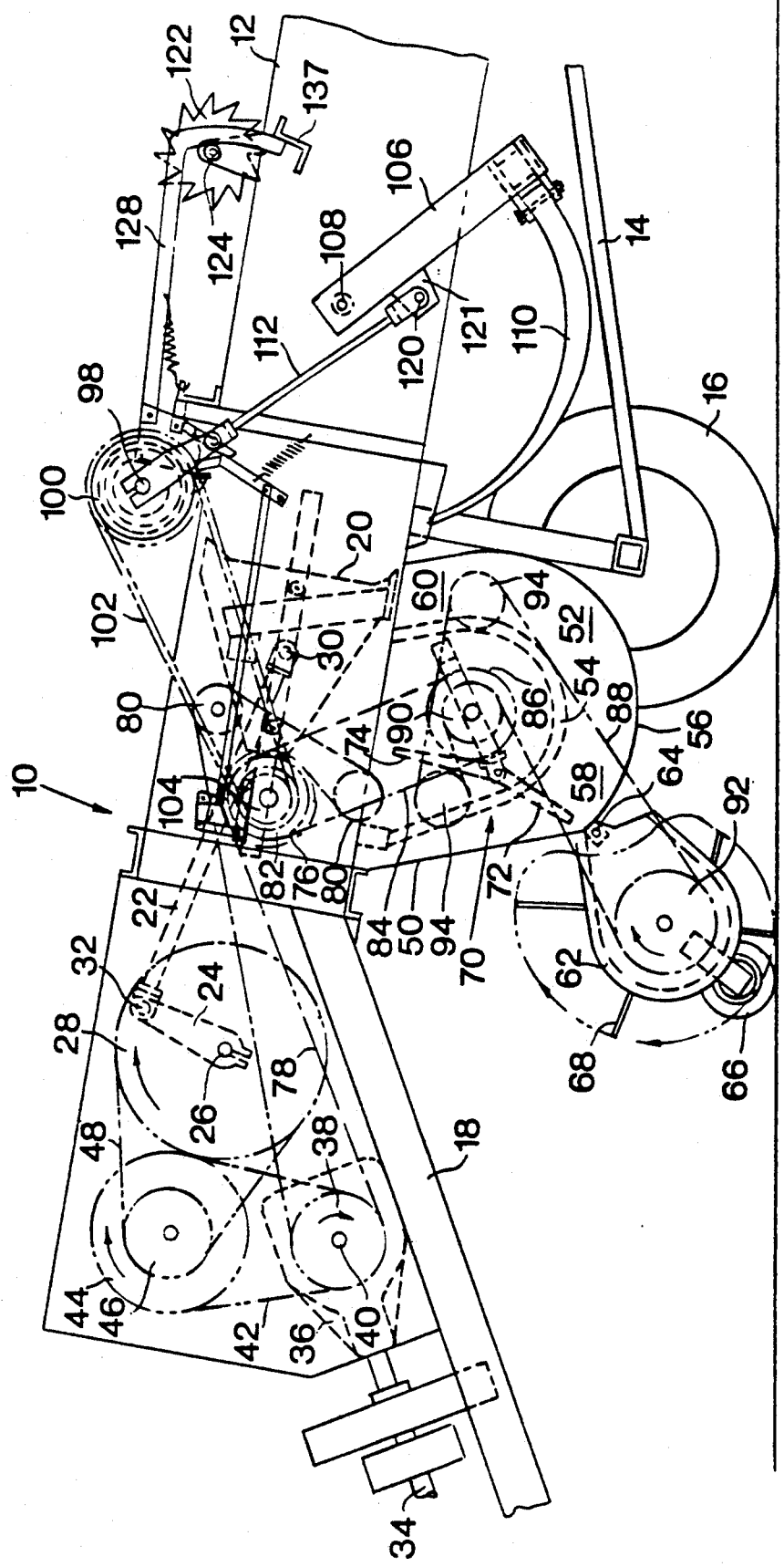
FIG. 1 is a side elevation view of a baler comprising one embodiment of the present invention.

Referring to FIG. 1, a baler 10 includes a bale case 12 mounted on a frame 14 which is supported by wheels 16. A tongue 18 extends forwardly from the bale case 12 for attachment to a tractor (not shown). A plunger 20 is reciprocably disposed in the bale case 12 to form crop material into rectangular bales. The plunger 20 is attached by a connecting rod 22 to a crank arm 24 fixed to a shaft 26 on which a sprocket 28 is fixedly mounted. The connecting rod 22 has a pivotal connection 30 at one end with the plunger 20 and another pivotal connection 32 at the other end with the crank arm 24.

A drive shaft 34 is connected at one end to a gearbox 36 carried on the baler 10 and is adapted for connection at the other end to the PTO of a tractor (not shown). The drive shaft 34 causes clockwise rotation, as viewed in FIG. 1, of a double sprocket 38 which is fixed to the output shaft 40 of the gearbox 36. The double sprocket 38 is connected via a chain 42 to a sprocket 44 of larger diameter. A sprocket 46 is fixed to rotate with the sprocket 44. This arrangement of sprockets provides a speed reduction from the double sprocket 38 to the sprocket 46. A chain 48 connects the sprocket 46 to the sprocket 28 to cause clockwise rotation of the sprocket 28, as viewed in FIG. 1, in order to cause reciprocation of the plunger 20 in a fore-and-aft direction in the bale case 12.

A feed chamber 50 is mounted underneath the bale case 12 and includes a curved duct 52 having top and bottom walls 54 and 56, respectively, and sidewalls. The top wall 54 is formed of a series of curved channel members, of inverted generally U-shaped cross-section, which are arranged side-by-side so that there are slots defined between adjacent channel members. The bottom wall 56 is formed primarily of a single curved, continuous panel member. The curved duct 52 is open at its lower end 58 and at its upper end 60 and communicates at its upper end 60 with an inlet opening formed in the bottom wall of the bale case 12. A pickup device 62 of a conventional type is pivotally connected at 64 to the feed chamber 50 and is supported by wheels 66. The pickup device 62 includes a plurality of fingers 68 which are rotatable in the direction indicated in FIG. 1 for lifting crop material from the ground and delivering it toward the feed chamber 50.

A feeder mechanism 70 is provided in the feed chamber 50 for moving crop material toward the lower end 58 of the duct 52, then through the duct 52 from its lower end 58 to its upper end 60, and then into the bale case 12 through the inlet opening in the bottom wall thereof. The feeder mechanism 70 includes two sets of feeder elements or tines 72,74 arranged to project through the slots in the top wall 54 of the duct 52.

The double sprocket 38 is connected to a sprocket 76 mounted on the side of the bale case 12 by a chain 78 in a backwrap manner to cause rotation of the sprocket 76 in a counterclockwise direction as indicated. The chain 78 also extends around idlers 80. Another sprocket 82 fixed to rotate with the sprocket 76 is connected by a chain 84 to a sprocket 86 to cause counterclockwise rotation of the sprocket 86 and thus operation of the feeder mechanism 70. A belt 88 extends around a sheave 90 that is connected to the sprocket 86 in a backwrap manner and around another sheave 92 on the pickup device 62 to rotate the sheave 92 in a clockwise direction and thus operate the pickup device 62. The belt 88 also extends around idlers 94, the forward one of which is preferably spring loaded to allow vertical movement of the pickup device 62 and to allow the belt 88 to slip if the pickup device 62 is overloaded.

Figure 2:
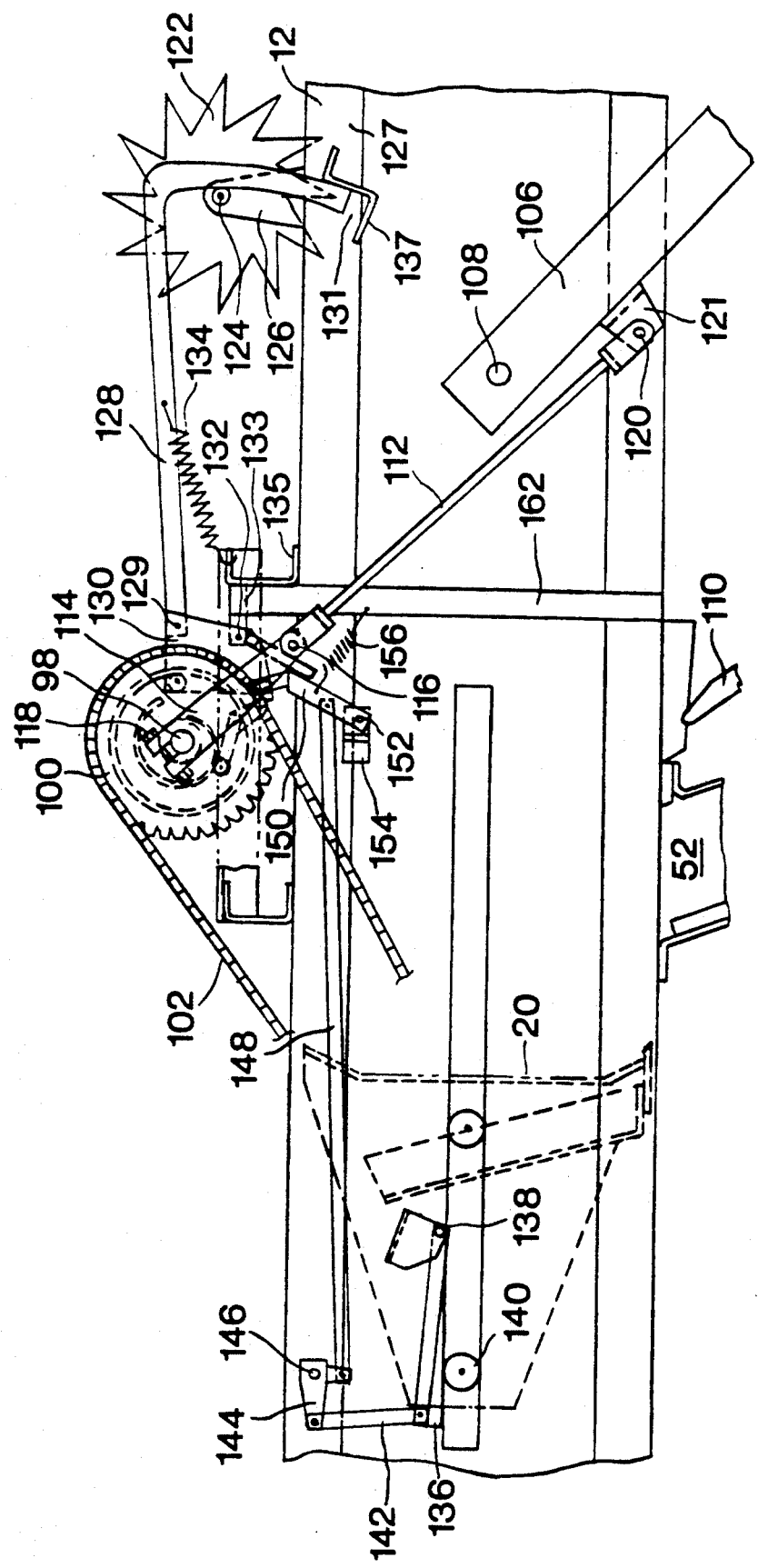
FIG. 2 is an enlarged view of a portion of the baler of FIG. 1.
Figure 3:
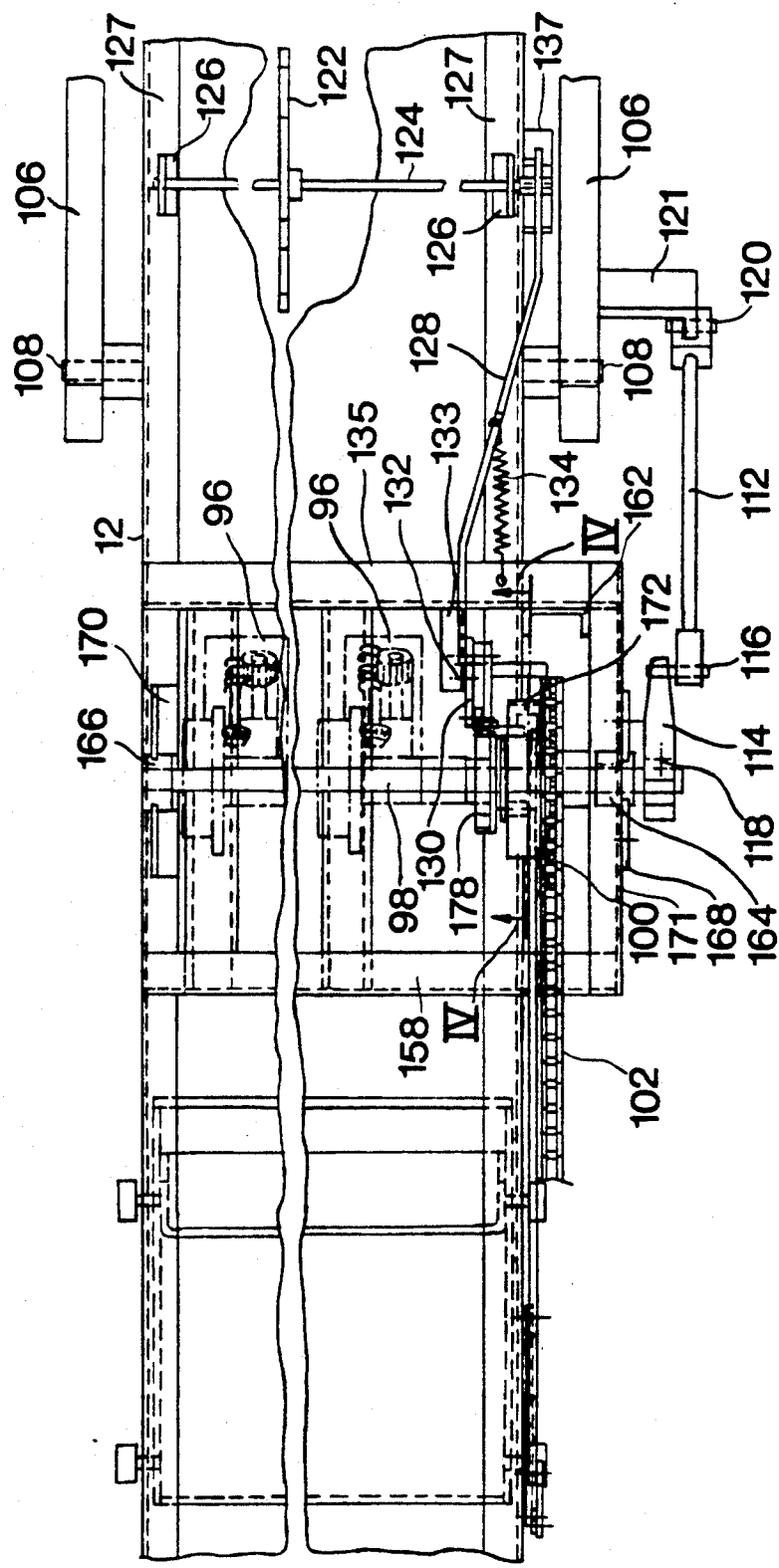
FIG. 3 is a plan view of the portion of the baler shown in FIG. 2.

The baler 10 includes a system for tying several strands of twine around a completed bale. This system includes a plurality of conventional knotters 96 (two of which are partially shown in phantom in FIG. 3) mounted above the bale case 12. The knotters 96 are driven by a shaft 98 on which a sprocket 100 is rotated. A chain 102 extends around the sprocket 100 and another sprocket 104 that is connected to rotate with the sprockets 76 and 82. The various sprockets are sized so that the sprocket 100 rotates twice as fast as the sprocket 28. Accordingly, the knotters 96 and needles 110, when actuated as explained later, advantageously will be driven at twice the speed of the plunger crank arm 24. A yoke 106 is pivoted on stub shafts 108 carried on the sides of the bale case 12. The yoke 106 carries a plurality of twine needles 110 for delivering strands of twine to the knotter 96 which form knots therein. As also seen in FIGS. 2 and 3, a link 112 is pivotally connected at one end to a crank arm 114 by a pin 116. The crank arm 114 is clamped to the shaft 98 by a bolt 118. The other end of the link 112 is pivotally connected by a pin 120 to a bracket 121 carried on the yoke 106. A tripping device for actuating the tying system includes a star wheel 122 fixed on a shaft 124 that is rotatably supported in brackets 126 mounted on the upper corner rails 127 of the bale case 12. The tripping device also includes an arm member 128 operatively coupled to the shaft 124 in a conventional manner, such as disclosed in U.S. Pat. No. 2,897,748.

Referring now to FIGS. 2 and 3, it will be seen that the arm member 128 has a plate 130 pivoted thereto at its forward end by a pin 129. The plate 130 is pivoted on a pin 132 carried on a frame member 133 of the bale case 12. A spring 134 is connected between the arm member 128 and a transverse beam 135 on the bale case 12 to urge the arm member 128 in a forward direction relative to the bale case 12. A ramp 136 is pivoted at one end on a pin 138 on the side of the bale case 12, and a roller 140 carried by the plunger 20 is positioned to roll underneath the lower surface of the ramp 136. A rod 142 is connected at its lower end to the ramp 136 and at its upper end to one arm of a bell crank lever 144 fulcrumed at 146 to the side of the bale case 12. A link 148 extends between the other arm of the bell crank lever 144 and a further link 150, which is pivoted by a pin 152 to a support 154 on the bale case 12. A spring 156 is connected between the further link 150 and a vertical beam 162 for urging the further link 150 in a clockwise direction around the pin 152 as seen in FIG. 2. As best can be observed in FIG. 3, the shaft 98 is rotatably supported at its ends in bearings 164, 166 carried by brackets 168, 170. Bracket 168 is secured to a beam 171 extending between the transverse beam 135 and another transverse beam 158 on the bale case 12, and bracket 170 is secured to the bale case corner rail 127.

Referring to FIG. 4, a hub 172 shown in cross-section is bolted to the sprocket 100 (not shown in FIG. 4). The hub 172 has a cam lobe 174 welded to its inner surface, and the hub 172 is rotated in the direction indicated by the arrow 176. A disk 178 is keyed to the shaft 98 behind the hub 172 as also seen in FIG. 3. A pawl assembly 180 is pivoted at 182 on the disk 178, and carries a roller 184 at one end for engagement with the cam lobe 174 on the hub 172. The end of the pawl assembly 180 opposite the roller 184 is formed with a tab 186. A spring 188 is connected between the pawl assembly 180 and the disk 178 to urge the pawl assembly 180 in a counter-clockwise direction about pivot 182 as viewed in FIG. 4. The plate 130 carries a first trip means, hereinafter referred to as the tab 190 disposed to engage the tab 186 on the pawl assembly 180. The link 150 is extended with a second trip means, called the tab 192, also for engagement with the pawl assembly tab 186. A locking means in the form of an extended arm 194 welded or otherwise secured to the plate 130 is operable, under certain operating conditions which will be described later, to engage the link 150 for maintaining the tab 192 in abutment with the pawl assembly tab 186.

In operating the baler 10, crop material is delivered into the bale case 12 by the feeder mechanism 70 where it is then compressed into bales by the plunger 20. While a bale is being formed, the arm 128 is in the position shown in FIGS. 2 and 4 so that the tab 190 thereon is located in a pawl assembly holding position, engaging the tab 186 on the pawl assembly 180. By the same token, the arm 194 locks the tab 192 in the position as shown in FIGS. 4 equally in engagement with the pawl assembly tab 186. The pawl assembly 180 is thereby held in a drive interrupting position where the roller 184 is out of the path of movement of the cam lobe 174 on the hub 172 which is constantly rotated with the sprocket 100 in the direction indicated by the arrow 176. Therefore, the disk 178 and the shaft 98 are stationary and the knotters 96 are idle for the time being. Meanwhile, the reciprocating movement of the plunger 20 in the bale case 12 causes the roller 140 to roll back and forth underneath the lower surface of the ramp 136. It will be observed that the connecting structure between the ramp 136 and the tab 192, being the rod 142, the bell crank 144 and the links 148, 150, are dimensioned in a manner such that the ramp 136 is out of the path of movement of the reciprocating roller 140 when the tab 192 is locked in the position as shown in FIGS. 2 and 4. In other words, although the roller 140 of the reciprocating plunger 20 is constantly moved underneath the ramp 136, the latter remains stationary for as long as the pawl assembly 180 is held in its drive interrupting position.

When a bale has reached the desired length, the star-wheel 122 and the shaft 124 will have rotated far enough to cause the arm 128 to be pivoted upwardly about the pin 129 to a point where a slot 131, that is defined between the end of the arm 128 and a bracket 137 which is attached thereto, receives the shaft 124. The arm 128 is then moved forwardly with respect to the bale case 12 by the spring 134 thereby resulting in rotation of the plate 130 about the pin 132 to a pawl assembly releasing position shown in FIG. 5 where the tab 190 on the plate 130 is out of engagement with the tab 186 on the pawl assembly 180. This tripping action most frequently occurs when the baler plunger 20 is approaching its maximum compaction position as at this point in the cycle an additional charge of crop material is added to the bale under formation whereafter the desired bale length is obtained. Occasionally however, this tripping action equally may occur at any other point of the reciprocating cycle of the plunger 20 and is then caused e.g. by machine vibrations. In any event, it will be appreciated that rotation of the plate 130 around the pin 132 equally will procure rotation of the arm 194 therearound as the arm 194 is firmly connected to the plate 130. Consequently, the link 150 carrying the tab 192 is permitted to rotate about the pin 152 under action of the spring 156, but not necessarily will do so under all operating positions of the plunger 20 as will be explained hereinafter.

As already mentioned, it is generally known in the art that the knotter cycle of a baler should be tripped always at precisely the same point in the plunger cycle i.e. when the plunger is approaching its full compaction position. In conventional balers where the knotter drive shaft is rotated at the same rotational speed as the plunger, timing of the knotter operation with the plunger movement is quite simple. Yet, the baler 10 presently under consideration is provided with a knotter shaft 98 driven at twice the rotational speed of the plunger crank shaft 26. That is, the knotters 96 and the needles 110 each make one complete knot tying cycle while the plunger 20 makes one-half of a complete stroke (i.e. 180° rotation of the plunger crank arm 24), which is in contrast with prior art balers of which the knotters and needles make one complete knot tying cycle while the plunger makes a complete stroke (i.e. 360° rotation of the plunger crank arm). As a result, the knotter tripping mechanism according to the invention should be synchronized with the plunger movement in order to ensure that the knot tying operation is carried out only when the plunger 20 is moving through the rearward half of its path. This timing requirement between the plunger movement and the knotter operation has necessitated the provision of the additional means according to the invention, which are an improvement in comparison with the embodiment depicted in U.S. Pat. No. 4,503,762. Said additional means are in the form of the structure comprising the roller 140 on the plunger 20, the ramp 136, the link 150 with the tab 192 thereon and the arm 194 on the plate 130.

The hub 172 and the plunger 20 are synchronized in their respective movements in a manner such that, as the plunger 20 reaches its maximum compaction position, the leading edge of the cam lobe 174 just has moved past the roller 184. In case the tab 190 is tripped upon the plunger 20 reaching said maximum compaction position, then the tab 192 equally will be tripped out of engagement with the pawl assembly tab 186 since the ramp 136 is free to pivot downwardly under influence of the spring 156. Indeed, since the plunger 20 is located in its rearmost position, the roller 140 thereon does not prevent downward rotation of the ramp 136. At this point in the cycle (i.e. when the plunger 20 is positioned in or close to its maximum compaction position) the link 150 with the tab 190 thereon is situated in the retracted position shown in phantom lines in FIG. 5. As both tabs 190, 192 are now freeing the tab 186, the pawl assembly 180 is pivoted in an anticlockwise direction around pivot 182 thus allowing the roller 184 to engage the inner surface of the cam lobe 174. Further rotation of the hub 172 in the direction 176 during the further movement of the plunger 20 allows the roller 184 to ride over the inner surface of the cam lobe 174 until it is allowed to "drop outwardly" and against the inner surface of the hub 172 behind the cam lobe 174. Consequently the roller 184 now is positioned in a drive engaging position i.e. in the path of movement of the cam lobe 174 as observed in phantom lines in FIG. 5.

As the shaft 98 is driven at twice the rotational speed of the crank shaft 26, the cam lobe 174 approaches the pawl assembly 180 already again as the plunger is approaching its fully retracted position. As explained hereabove, at this point in the cycle the knotter mechanism may not be actuated and this is guaranteed by the following.

When the plunger 20 is moved forwardly in the bale case 12 in a subsequent retracting stroke towards the phantom position of FIG. 2, the roller 140 pushes the ramp 136 upwardly about the pin 138. Caused thereby, the rod 142 is pushed upwardly, effecting the bell crank 144 to pivot around its fulcrum 146 and pulling the link 148 forwardly with respect to the bale case 12. As such, the link 150 with the tab 192 thereon is returned to the full line position of FIG. 5. In so doing, the tab 192 again engages the pawl assembly tab 186 whereby the pawl assembly 180 is pivoted opposite to the force of the spring 188 in the clockwise direction around pivot 182 to the full line position of FIG. 5 whereby the pawl assembly 180 is pivoted out of the path of movement of the approaching cam lobe 174. It thus will be appreciated that while the plunger 20 is performing a retracting stroke in the bale case 12, the pawl assembly 180 always is prevented from coupling the continuously rotating hub 172 to the disk 178 since under those operating conditions of the plunger 20, the tab 192 forces the pawl assembly 180 from its drive engaging position towards its drive interrupting position.

When the plunger 20 subsequently moves toward the end of its rearward or compacting stroke, the ramp 136 again is permitted to pivot downwardly, thereby pushing the link 150 to the pawl assembly releasing position abutting against the arm 194 as shown in FIG. 6 and moving the tab 192 on the link 150 out of engagement with the pawl assembly tab 186. The spring 188 again urges the pawl assembly 180 to the position where the roller 184 is in the path of movement of the cam lobe 174. As the plunger 20 is approaching its maximum compaction position, the cam lobe 174 is moved a second time towards the intercepting area with the roller 184. This time, the cam lobe 174 engages the roller 184 and remains in contact therewith for a full revolution of the disk 178. During this revolution of the disk 178 and the shaft 98 supporting the latter the tying system is operated. That is, the needles 110 are moved through the bale case 12 to deliver twine to the knotters 96 which are driven to form knots in the twine.

The disk 178 carries a cam track 196 which engages a roller 198 on the plate 130 as the disk 178 is rotated. This serves to reset the arm 128 to the position shown in FIG. 2 after one complete (360 degree) revolution of the disk 178. The tab 190 on the plate 130 is returned to the position shown in FIG. 4 so that it re-engages the tab 186 on the pawl assembly 180. Concurrent therewith and by intermediary of the locking arm 194, the tab 190 equally is repositioned in its pawl assembly holding position. The pawl assembly 180 thus is returned to the position as seen in FIG. 4 following a single revolution of the disk 178 and the shaft 98.

As already discussed, it occasionally may happen that the tripping action of the tab 190 is not effected when the plunger 20 is close to its full compaction position, but equally could occur e.g. when the plunger 20 has only commenced its compaction stroke. In the latter case, the operating cycle of the knotter mechanism varies substantially from the one already depicted hereabove since actuation of the knotters 96 is not delayed any longer by the plunger cycle. Indeed, tripping of the tab 190 permits the tab 192 equally to trip as soon as the compressing plunger 20 has disengaged the ramp 136 whereby the pawl assembly roller 184 is permitted to move to the position shown in FIG. 6 i.e. ready to be intercepted by the cam lobe 174. Upon the plunger 20 approaching its full compaction position, the cam lobe 174 engages the roller 184 thereby coupling the hub 172 to the disc 178 thereby initiating the tying operation. It accordingly will be understood that in the above situation the coupling between the cam lobe 174 and the pawl assembly roller 184 is effected immediately, without the hub 172 having to perform another full rotation as was the case with the first explained situation.

To facilitate the disengagement of the pawl assembly roller 184 from the cam lobe 174, special attention has to be given to the finishing of the surface of the leading edge of the latter. In prior art balers the radius of curvature of said leading edge normally equals the radius of the pawl assembly roller for holding the latter firmly in engagement. Yet, during disengagement, this roller has to be pivoted tangentially out of the arc formed by the cam lobe leading edge. Accordingly, the roller is forced to roll over the inner edge of said arc, bringing a relative displacement about between the hub 172 and the disc 178; a displacement which has to be neutralized e.g. by strain in the chains in the knotter drive line. The leading edge of the cam lobe 174 according to the invention has been provided with a radius of curvature which is fairly larger than the radius of the roller 184 so that during disengagement of the two elements, the roller 184 smoothly can roll over the leading surface of the cam lobe 174 and out of engagement therewith without creating the aforementioned relative displacement between the hub 172 and the disc 178.

From what precedes it thus will be appreciated that the second trip means 192 is held in a pawl assembly holding position for as long as the first trip means 190 engages the pawl assembly tab 186 and this by the intermediary of the locking means 194. In other words, the second trip means 192 is held stationary during the entire bale forming cycle even though the plunger 20 continuously is reciprocating in the bale case 12. Only under the combined condition of the first trip means 190 being tripped and the plunger 20 being located close to its maximum compression position, the second trip means 192 is allowed to assume a pawl assembly releasing position thereby initiating the tying operation.

According to present invention, the second trip means 192, when pivoted from its pawl assembly holding position towards its pawl assembly releasing position, is initially moved substantially in the same direction as the tab 186 carried by the pawl assembly 180, when the latter is pivoted from its drive interrupting position towards its drive engaging position. This is in contrast with the prior art baler described in U.S. Pat. No. 4,503,762, of which the second trip means is pivotable in a generally perpendicular direction to the path of movement referred to hereabove of the pawl assembly tab 186. The foregoing prior art arrangement has necessitated the second trip means to be positioned a short distance past the first trip means when seen in the direction of rotation of the pawl assembly in order to allow the second trip means to move in front of the pawl assembly tab when the latter is released by the first trip means. A serious drawback results therefrom however in that upon tripping of the first trip means and while the plunger is performing a retracting stroke, the knotters and needles are actuated for a very short period of time immediately whereafter the coupling between the drive and the tying mechanism is disengaged again by the interference of the second trip means. It will be understood that this disengaging of the drive may be acceptable functionally on the one hand, but is energy-consuming and effects premature wear of components on the other hand. Indeed, energy is spent to set the tying mechanism in motion, not for a complete tying cycle, but only for a very short angular displacement whereafter the tying mechanism is completely halted again. Upon the plunger performing, a subsequent compaction stroke, the tying mechanism then has to be actuated for a second time, now effecting a full tying cycle.

The arrangement according to the present invention has overcome the mentioned drawbacks by selecting a specific location of the pivot pin 152 of the second trip means 192 and the pivot 182 of the pawl assembly 180 with respect to the orientation of the abutment tab 186, respectively the second trip means 192. As already indicated, the abutment tab 186 is provided on the outer end of a pawl assembly crank arm 181. While the second trip means 192 engages the pawl assembly abutment tab 186 to hold the pawl assembly 180 in its drive interrupting position, the pawl assembly crank arm 181 is virtually aligned with the link 150. It will also be observed that under this operating condition of the pawl assembly 180, the contact surface of the abutment tab 186 normally engaging the first and second trip means 190, 192 is oriented generally parallel to the connecting line between the pin 152 around which the link 150 pivots and the pivot 182 of the pawl assembly 180. To some extent, the same can be said about the tab 192 so that in effect, one could consider the second trip means 192 on the link 150 to be arranged 37 radially" with respect to the abutment tab 186 and the crank arm 181. Due to the foregoing configuration and when the tab 192 is pivoted to its pawl assembly releasing position allowing the pawl assembly to assume its drive engaging position, the tabs 186 and 192 initially are moved substantially in the same direction whereafter they flare outwardly with respect to each other in a manner comparable to the swinging movement of a double swing door as can be observed in FIG. 5. Upon the plunger 20 retracting in the bale case 12, the link 150 carrying the tab 192 is pivoted in a counter-clockwise direction around pin 152, as already described, while contacting the tab 186 and accordingly forcing the pawl assembly 180 back to its drive interrupting position as seen in FIG. 5. In other words, before the cam lobe 174 has reached the intercepting area with the pawl assembly roller 184, the latter already has been swung completely out of the way permitting the cam lobe 174 to pass underneath without any contact being made. This contact is only effected during the subsequent compaction stroke of the plunger 20, whereby a full tying cycle is initiated.

The present embodiment in this manner avoids a temporarily purposeless coupling being made between the knotter mechanism and its drive as was the case with the baler shown in U.S. Pat. No. 4,503,762. The present baler thus is substantially more energy-efficient and more durable in construction as the knotter components are less subjected to wear.

Figure 7:
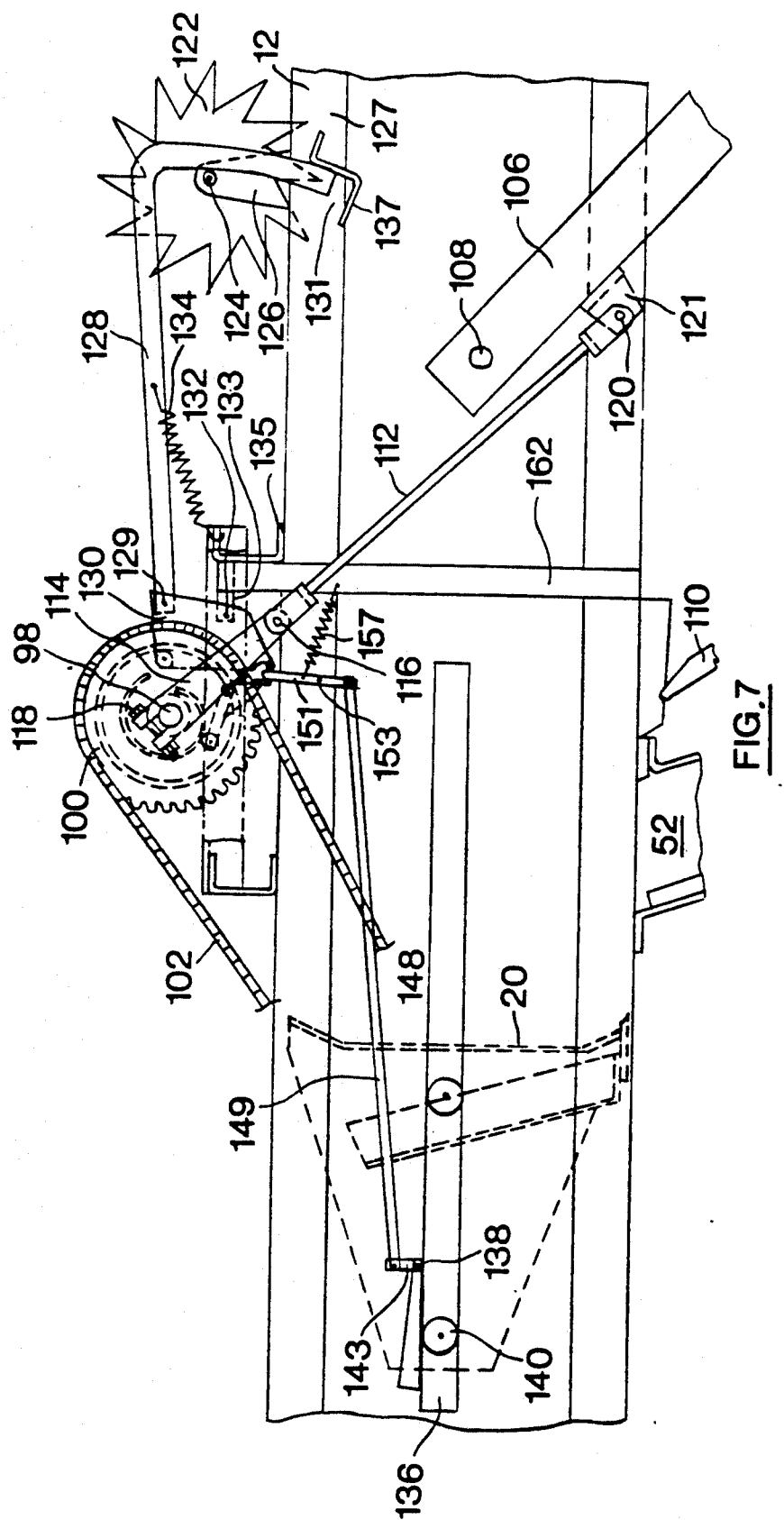
FIG. 7 is a view similar to FIG. 2 but showing an alternative embodiment.
Figure 8:
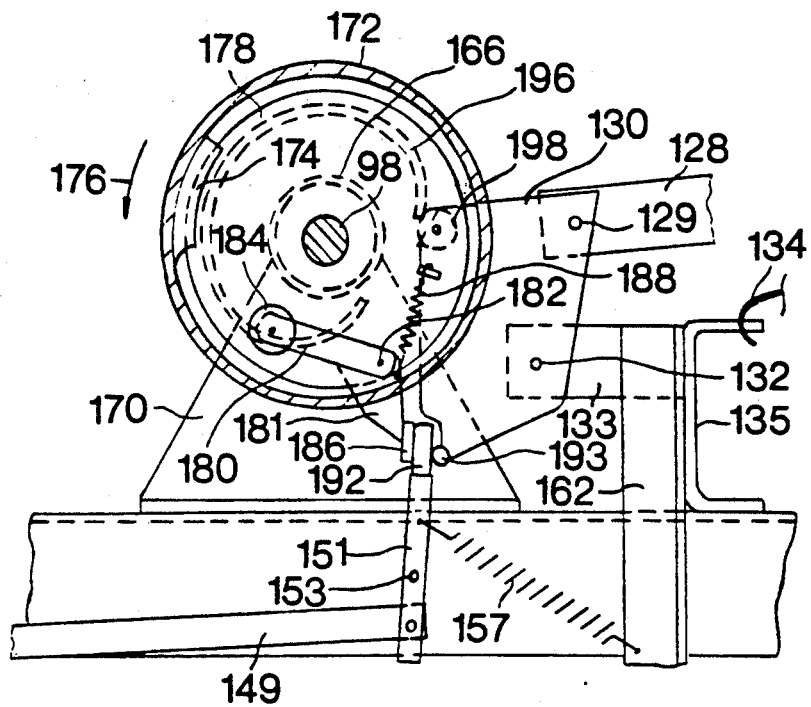
FIG. 8 and 9 are enlarged sectional views similar to FIGS. 4 and 6 but showing the alternative embodiment.
Figure 9:
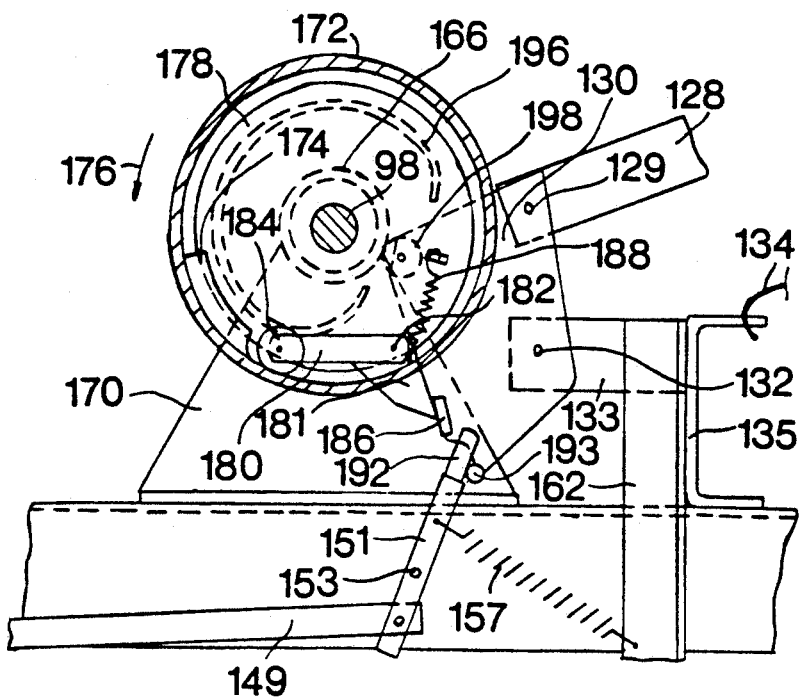

Turning now to FIGS. 7, 8 and 9 of the drawings, an alternative embodiment is shown in which the connecting structure between the ramp 136 and the second trip means or tab 192 is modified in order to render the overall construction more compact. Also the first trip means and cooperating locking means have been altered substantially as will be described hereafter. The ramp 136 is extended with an upwardly directed rod 143 which is pivotable in unison therewith around the pivot pin 138. A link 149 is provided between the rod 143 and the lower end of a further link 151, which carries the second trip means 192 at its upper end for engagement with the pawl assembly tab 186. The further link 151 is pivotably attached to the bale case 12 by means of an intermediate pivot 153. The second trip means 192 is urged towards its pawl assembly releasing position by a spring 157, which by the same token aims to swing the ramp 136 into the path of movement of the roller 140 on the reciprocating plunger 20.

Referring more specifically to FIGS. 8 and 9, it will be observed that the plate 130, forming a link between the bale length metering means 122 and the pawl assembly 180, has been modified when compared to the first embodiment to the extent that no tab is provided thereon any longer for directly engaging the pawl assembly tab 186. Instead, a tab 193 firmly secured to the plate 130, has taken over the function of as well the tab 190 as the locking arm 194 of the first embodiment. In as much as said tab 190 and said arm 194 were rigidly connected to each other by the intermediary of the plate 130, movement of the one element resulted in movement of the other element and vice versa. As a consequence, the pawl assembly 180 was held in its drive interrupting position directly by the tab 190 on the one hand, and indirectly by the locking arm 194 through the tab 192 on the other hand. Also, upon the tab 190 being tripped, the locking arm 194 equally was withdrawn from the tab 192, taking no part any longer in the actual tripping of the tying mechanism. The alternative embodiment now proposes to provide the tab 193 on the plate 130 in a manner such that the back side of the tab 192 is engageable by the tab 193 for controlling on the one hand, the position of the tab 192, and, on the other hand, the position of the pawl assembly 180 via said tab 192. In FIG. 8, the arrangement is shown in its idle position before any tripping has occurred while FIG. 9 depicts the pawl assembly 180 in a condition ready to drive the tying mechanism. In essence, the working principle of the alternative arrangement is identical to the one already described in connection with the first embodiment and therefore will not be repeated here.

It will be appreciated that in the alternative embodiment, the overall number of elements synchronizing the movement of the plunger with the tying mechanism has been reduced further in order to obviate the necessity of maintenance and readjustments.

The foregoing description illustrates preferred embodiments of the invention. However, concepts employed may, based upon such description, be employed in other embodiments without departing from the scope of the invention.

It, for example, will be apparent that the coupling mechanism between the plunger 20 and the tab 192 may be modified so that the second trip means 192 is held stationary in the pawl assembly holding position until a complete bale has been formed The tripping of the tying mechanism by the conventional trip mechanism including the starwheel 122 and the components coupled thereto is neutralized unless the plunger 20 is located at or adjacent its full compaction position.

The present invention may be used on a wire tie mechanism including wire twisters instead of knotter mechanisms.

I claim:

1. A baler comprising:
   a bale case;
   a plunger reciprocable forwardly and rearwardly in the bale case for compressing crop material into bales during a rearward compacting stroke;
   a tying machine mounted on the bale case for tying a strand of binding material around a bale;
   drive means for driving the tying mechanism and including a clutch mechanism, said clutch mechanism having a pawl assembly with an abutment tab and being movable between a drive interrupting position and a drive engaging position;
   bale length metering means;
   first trip means operatively associated with the bale length metering means and cooperable with said abutment tab, said metering means being operable to locate said first trip means in a pawl assembly holding position maintaining the pawl assembly in its drive interrupting position until a bale of predetermined length is formed, said metering means also being operable to retract said first trip means to a pawl assembly releasing position permitting the pawl assembly to move to its drive engaging position when a bale or predetermined length is formed;
   second trip means also cooperable with said pawl assembly abutment tab and movable between a pawl assembly holding position for maintaining the pawl assembly in its drive interrupting position and a pawl assembly releasing position for permitting the pawl assembly to move to its drive engaging position, said second trip means being operatively associated with the plunger in a manner so that the second trip means is positioned in its pawl assembly holding position when the plunger is retracted; and
   characterized in that:
   said second trip means is maintained in abutment with said abutment tab when is said pawl assembly holding position to prevent movement of said pawl assembly when in its drive interrupting position.
   said second trip means is displaced from said abutment with said abutment tab when the plunger is reciprocating rearwardly in its compacting stroke, and
   the initial displacement of the second trip means, when moved from its pawl assembly holding position towards its pawl assembly releasing position, is oriented substantially in the same direction as the initial displacement of the pawl assembly abutment tab, when said pawl assembly is moved from its drive interrupting position towards its drive engaging position.

2. A baler according to claim 1, wherein the pawl assembly abutment tab is provided at one end of a pawl assembly crank arm and the second trip means is carried by a link, the pawl assembly crank arm and the link being pivotable about a pivot and a pivot pin, respectively, and characterized in that the pawl assembly crank arm is substantially aligned with the link when the second trip means engages the pawl assembly abutment tab in a condition for maintaining the pawl assembly in its drive interrupting position.

3. A baler according to claim 2, characterized in that the surface of the abutment tab, which is cooperable with the first and second trip means, is oriented generally parallel to the connecting line between the pivot of the pawl assembly and the pivot pin of the link when the pawl assembly is located in its drive interrupting position.

4. A baler according to claim 1, wherein said first trip means abuts against said second trip means, and
   said second trip means abuts against said abutment tab, whereby said second trip means is held in said drive interrupting position until said first trip means is retracted to said pawl assembly releasing position.

* * * * *